United States Patent
Kardos et al.

(10) Patent No.: US 9,758,009 B2
(45) Date of Patent: Sep. 12, 2017

(54) ARRANGEMENT FOR MAINTAINING A DESIRED OPERATING TEMPERATURE OF A BATTERY IN A VEHICLE

(75) Inventors: Zoltan Kardos, Södertälje (SE); Ola Hall, Stockholm (SE)

(73) Assignee: SCANIA CV AB (SE)

( * ) Notice: Subject to any disclaimer, the term of this patent is extended or adjusted under 35 U.S.C. 154(b) by 485 days.

(21) Appl. No.: 13/811,492

(22) PCT Filed: Jul. 19, 2011

(86) PCT No.: PCT/SE2011/050954
§ 371 (c)(1),
(2), (4) Date: Jan. 22, 2013

(87) PCT Pub. No.: WO2012/021104
PCT Pub. Date: Feb. 16, 2012

(65) Prior Publication Data
US 2013/0118707 A1    May 16, 2013

(30) Foreign Application Priority Data

Aug. 12, 2010    (SE) ...................................... 1050849

(51) Int. Cl.
*B60H 1/00*     (2006.01)
*H01M 10/613*   (2014.01)
(Continued)

(52) U.S. Cl.
CPC ..... *B60H 1/00278* (2013.01); *B60H 1/00885* (2013.01); *H01M 10/613* (2015.04);
(Continued)

(58) Field of Classification Search
CPC ............ B60H 1/00278; B60H 1/00885; B60H 2001/00307; B60H 2001/00928;
(Continued)

(56) References Cited

U.S. PATENT DOCUMENTS 4,951,769 A * 8/1990 Kawamura .............. 180/65.245
6,138,466 A    10/2000 Lake et al.
(Continued)

FOREIGN PATENT DOCUMENTS

DE    EP 1266779 A2 * 12/2002 ......... B60H 1/00885
EP    1 266 779 A2    12/2002
(Continued)

OTHER PUBLICATIONS

Machine Translation of JP 2002-352866,—Retrieved Dec. 11, 2014.*
Machine translation of EP1266779 A2, retrieved Oct. 26, 2016.*
International Search Report dated Nov. 16, 2011 issued in corresponding international patent application No. PCT/SE2011/050954.
International Preliminary Report on Patentability dated Jun. 14,
(Continued)

*Primary Examiner* — Len Tran
*Assistant Examiner* — Hans Weiland
(74) *Attorney, Agent, or Firm* — Ostrolenk Faber LLP

(57) ABSTRACT

An arrangement for maintaining an operating temperature of a battery (8) in a vehicle (1). A cooling system (12) with a circulating coolant. A radiator (14) to cool the coolant includes a heat-transfer region (12a) where the coolant is in contact with the battery (8). An AC installation with a circulating refrigerant includes a first circuit with a first evaporator (21) in which a refrigerant cools air in a driving cab space (2) of the vehicle (1), and a first condenser (17) where the refrigerant releases thermal energy; a second circuit with a second evaporator where the refrigerant cools the coolant in the cooling system (12), and a second condenser (24) where the refrigerant warms the coolant in the cooling system (12).

8 Claims, 2 Drawing Sheets

(51) Int. Cl.
   *H01M 10/615* (2014.01)
   *H01M 10/625* (2014.01)
   *H01M 10/6568* (2014.01)
   *H01M 10/663* (2014.01)

(52) U.S. Cl.
   CPC ....... *H01M 10/615* (2015.04); *H01M 10/625* (2015.04); *H01M 10/6568* (2015.04); *H01M 10/663* (2015.04); *B60H 2001/00307* (2013.01)

(58) Field of Classification Search
   CPC ............ H01M 10/613; H01M 10/615; H01M 10/625; H01M 10/6568; H01M 10/663
   USPC .............................. 165/41, 42, 202, 266, 299
   See application file for complete search history.

(56) References Cited

U.S. PATENT DOCUMENTS

| | | | |
|---|---|---|---|
| 7,048,044 B2 * | 5/2006 | Ban et al. ..................... | 165/202 |
| 2002/0184908 A1 | 12/2002 | Brotz et al. | |
| 2007/0157647 A1 * | 7/2007 | Duhme et al. ............... | 62/196.4 |
| 2009/0249802 A1 * | 10/2009 | Nemesh ............ | B60H 1/00278 |
| | | | 62/56 |

FOREIGN PATENT DOCUMENTS

| FR | 2 866 472 A1 | 8/2005 |
|---|---|---|
| JP | 2002-352886 | 12/2002 |

OTHER PUBLICATIONS 2012 issued in corresponding international patent application No. PCT/SE2011/050954.

* cited by examiner

ARRANGEMENT FOR MAINTAINING A DESIRED OPERATING TEMPERATURE OF A BATTERY IN A VEHICLE

CROSS-REFERENCE TO RELATED APPLICATIONS

The present application is a 35 U.S.C. §§371 national phase conversion of PCT/SE2011/050954, filed Jul. 19, 2011, which claims priority of Swedish Application No. 1050849-7, filed Aug. 12, 2010, the contents of which are incorporated by reference herein. The PCT International Application was published in the English language.

BACKGROUND TO THE INVENTION AND PRIOR ART

The present invention relates to an arrangement for maintaining a desired temperature of a battery in a vehicle.

Hybrid vehicles powered by electricity in combination with some other form of fuel are equipped with one or more batteries to store electrical energy and with regulating equipment to regulate the flow of electrical energy between the battery and an electrical machine which alternately serves as motor and generator, depending on the vehicle's operating state. The battery and the regulating equipment are inevitably subject to a certain warming during operation. For optimum operation of the battery and the regulating equipment they should not be warmed to too high a temperature. Depending on its type, the battery should not be warmed above a highest temperature, e.g. of the order of 45° C. The regulating equipment may be warmed to a somewhat higher temperature. The battery and the regulating equipment therefore need cooling during operation. Most batteries have an optimum operating temperature between 20 and 30° C. The battery may therefore also need to be warmed at times when it is at too low a temperature.

A known practice is to use air to cool batteries in hybrid vehicles, but the air needs to be of high quality because batteries are sensitive to pollutants and moisture. Accordingly, a known practice is for the battery to be situated in the driving cab space of vehicles, where the air is of high quality and at a suitable temperature. In such cases, a fan may generate a cooling air flow through the battery. However, it is for various reasons desirable for the battery to be situated elsewhere in the vehicle than in the cab space. Another known practice is to place the battery in the vehicle's engine space. Since the air in the engine space of a vehicle is more or less polluted, it cannot be used directly for cooling battery. In such cases, the battery is encased in a suitable way and an AC installation is used to cool it. When the battery needs warming, this can be effected by means of electrical components or by coolant from the cooling system which cools the engine. A relatively complex arrangement is thus required to maintain a desired temperature of a battery in an engine space. Using an AC installation to cool a battery during operation involves also supply of a relatively large amount of energy.

SUMMARY OF THE INVENTION

The object of the present invention is to propose an arrangement in the form of a relatively simple configuration capable of both warming and cooling the battery so that the latter can maintain a desired operating temperature.

This object is achieved with the arrangement of the kind mentioned herein. The battery is cooled by a cooling system with a circulating coolant. Such a cooling system may be of relatively simple configuration and cater for the main cooling of the battery. The vehicle comprises also an AC installation to cool a cab space of the vehicle. According to the present invention, this AC installation is provided with a second circuit which comprises a further condenser and a further evaporator. The second condenser may be used to effect warming of the coolant in the cooling system and hence warming of the battery when so required. The second evaporator in the second circuit may be used to provide extra cooling of the coolant in the cooling system and hence extra cooling of the battery when so required. This case thus involves using a relatively simple cooling system with a circulating coolant for the main cooling of the battery in the container. When extra cooling is required or the battery needs warming, said partly existing AC installation may be used to warm or cool the battery so that a desired battery operating temperature is maintained. Such an arrangement may be of relatively simple construction with relatively few components.

According to an embodiment of the present invention, the arrangement comprises a container adapted to enclosing the battery. Enclosure in a container prevents surrounding air from coming into direct contact with the battery. It is therefore even possible for the container with the battery to be situated at locations in the vehicle where the surrounding air contains pollutants and moisture. The second condenser and the second evaporator are with advantage also situated within the container, in which case they are at a protected location in a clean environment.

According to a preferred embodiment of the present invention, the second circuit with the second condenser and the second evaporator is arranged parallel relative to the first circuit with the first condenser and the first evaporator. With such a version of the AC installation, a shared compressor may be used to convey the refrigerant to both the first circuit and the second circuit. The same compressor may also be used to draw vaporised refrigerant back from both the first evaporator and the second evaporator. Batteries have a desired operating temperature which corresponds to approximately the temperature of the air in the cab space. This makes it easier to use a single AC installation.

According to a preferred embodiment of the present invention, said radiator which cools the coolant in the cooling system is air-cooled. The radiator is with advantage situated at a location in the vehicle where it has air at the temperature of the surroundings flowing through it, in which case the coolant may undergo cooling in the radiator to a temperature close to the temperature of the surroundings. A cooling fan may be provided near to the radiator to render the cooling of the coolant in the radiator more effective. The radiator may be situated at an external location close to the container, in which case it may be fastened to an external surface of the container. This makes it possible for the lines of the cooling system to be very short.

According to another preferred embodiment of the invention, the cooling system comprises circulation means capable of circulating the coolant in two different directions through the cooling system. Such a circulation means may take the form of a reversible pump, in which case the radiator may with advantage be situated at a location in the cooling system between the second condenser and the second evaporator. This makes it possible for the coolant circulated in a given direction to undergo a final cooling in the second evaporator before it is led to the battery, in which case the coolant led to the battery will be at a lower temperature than when it is only cooled in the radiator, and the cold coolant provides here very effective cooling of the battery. When circulated in an opposite direction, the coolant undergoes a final warming in the second condenser before it is led to the battery, in which case the coolant led to the battery will be at a relatively high temperature. Coolant circulating in this opposite direction provides effective warming of the battery. If the battery is at too low a temperature, the coolant is therefore circulated in the direction in which it warms the battery, and if the battery is at too high a temperature, the coolant is circulated in an opposite direction in which it cools the battery.

According to another preferred embodiment of the invention, the arrangement comprises a control unit adapted to controlling the arrangement so that the refrigerant is only circulated through the second circuit at times when the cooling system alone has insufficient capacity to maintain a desired operating temperature of the battery. Cooling the battery with coolant which circulates in the cooling system involves substantially only supply of energy to run a pump or similar circulation means for circulating the coolant. The amount of energy consumed in circulating the coolant is relatively small. Running an AC installation results in significantly more energy consumption. It is therefore of advantage from an energy perspective if the AC installation is only used at times when the cooling system alone has insufficient capacity to maintain a desired operating temperature of the battery. The control unit receives with advantage information from a temperature sensor which detects the temperature of the battery, in order to decide whether the AC installation should be activated or not. When the AC installation needs activating, the control unit decides in which direction the coolant has to be circulated for the battery to undergo desired cooling or warming.

According to another embodiment of the present invention, the arrangement comprises regulating equipment adapted to regulating the flow of electrical energy to and from the battery, the regulating equipment being likewise situated within the container, in which it is in contact with the circulating coolant in a heat-transfer region of the cooling system. Such regulating equipment is likewise subject to warming during operation. It may therefore be appropriate to cool the regulating equipment by means of the same cooling system as cools the battery. However, the regulating equipment may normally be allowed to be warmed to a somewhat higher temperature than the battery. The respective coolant flows to the battery and the regulating equipment may be so dimensioned that the battery undergoes cooling to a lower temperature than the regulating equipment.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
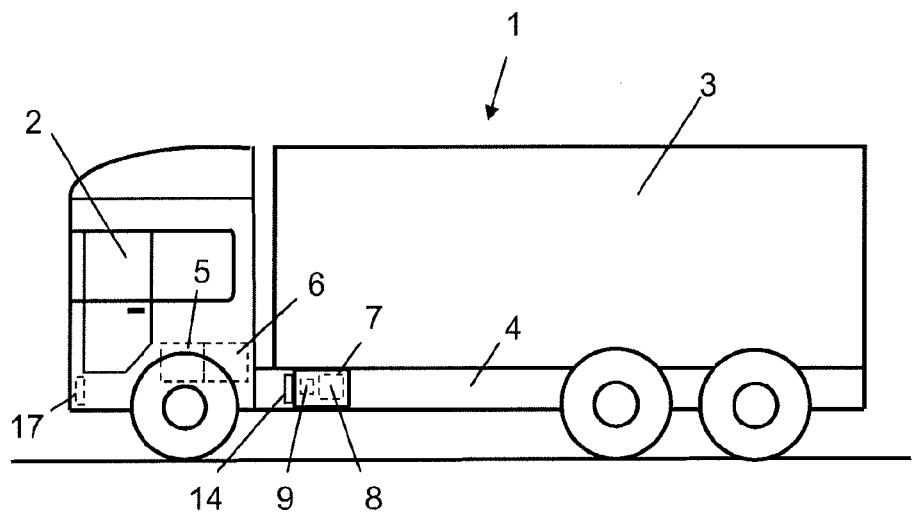
FIG. 1 depicts a hybrid vehicle with a container for a battery.

FIG. 1 depicts a freight vehicle 1 provided with a driving cab space 2 and a cargo space 3. The body of the freight vehicle 1 comprises longitudinal load bearing members 4. The freight vehicle 1 is a hybrid vehicle powered by a schematically depicted combustion engine 5 and/or a schematically depicted electrical machine 6. When the electrical machine 6 serves as motor, it powers the vehicle 1 either by itself or in conjunction with the engine 5. The electrical machine 6 serves as generator at times when the vehicle 1 is being braked. The electrical machine 6 can itself brake the vehicle up to a certain brake level. At higher brake levels, the braking process is supplemented by the vehicle's ordinary brakes. A container 7 is fastened on one of the load bearing members 4. A battery 8 to store electrical energy and regulating equipment 9 to regulate the flow of electrical energy between the battery 8 and the electrical machine 6 are situated in the container device 7.

Figure 2:
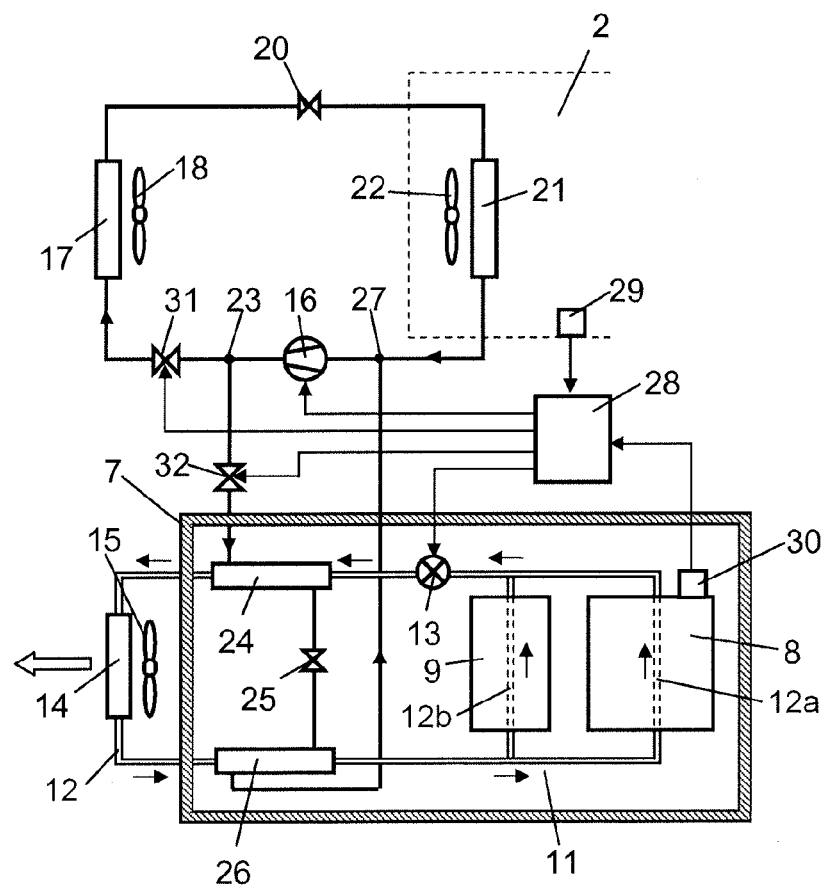
FIG. 2 depicts an arrangement for maintaining a desired operating temperature of the battery and FIG. 3 depicts the arrangement in FIG. 2 in another operating state.
Figure 3:
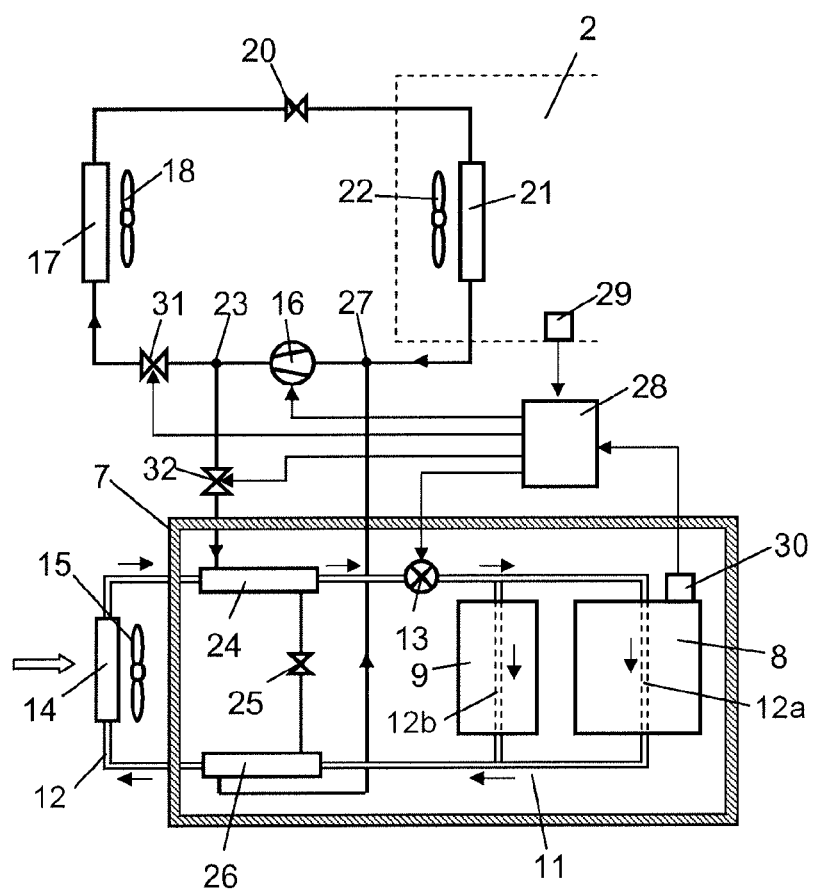

FIGS. 2 and 3 depict the container 7 in more detail. The container 7 is closed and contains an internal space 11. The battery 8 and said regulating equipment 9 are situated within the closed space 11. The battery 8 and the regulating equipment 9 are thus completely protected from surrounding air which may be moist and polluted. A cooling system 12 with a circulating coolant is arranged to be in heat-transfer contact with the battery 8 and the regulating equipment 9 within the container 7. A reversible pump 13 circulates the coolant through the cooling system 12. A radiator 14 is situated on the outside of the container 7, in contact with surrounding air. A fan 15 is provided to force air through the radiator 14 in order to render the cooling of the coolant more effective. The coolant is in heat-transfer contact with the battery 8 in a line region 12a. The coolant is in heat-transfer contact with the regulating equipment 9 in a line region 12b.

The vehicle 1 is provided with an AC installation to maintain a desired temperature in the cab space 2. The AC installation comprises a compressor 16 adapted to compressing a gaseous refrigerant. The gaseous refrigerant thereby acquires a raised pressure and a raised temperature. The AC installation comprises a first circuit with a first condenser 17 in which the gaseous refrigerant is cooled to a temperature at which it condenses. The first condenser 17 is here situated at a front portion of the vehicle 1, in contact with surrounding air. A fan 18 forces an air flow through the condenser 17.

The condensed refrigerant is led to an expansion valve 20 in which it undergoes throttling and thereby acquires a lower pressure and a lower temperature. The refrigerant is thereafter led to an evaporator 21 situated in or close to the cab space 2. A fan 22 forces the air in the cab space through the evaporator 21. The refrigerant is warmed by the air in the evaporator 21 to a temperature at which it vaporises. The air in the cab space 2 thus undergoes a corresponding cooling. The vaporised refrigerant in the evaporator 21 is drawn back to the compressor 16. This portion of the AC installation corresponds to a substantially conventional AC installation.

In this case, however, the AC installation comprises a second circuit. The second circuit receives warm gaseous refrigerant from the compressor 16 at a location 23 in the first circuit. The gaseous refrigerant is led in the second circuit to a second condenser 24 in which it is cooled to a temperature at which it condenses. The second condenser 24 is situated within the container 7, where it warms the coolant which circulates in the cooling system 12. The condensed refrigerant is led to an expansion valve 25 in which it undergoes throttling and thereby acquires a lower pressure and a lower temperature. The refrigerant is thereafter led to a second evaporator 26 likewise situated within the container 7, where it cools the coolant which circulates in the cooling system 12. The refrigerant is warmed in the second evaporator 26 to a temperature at which it vaporises. The vaporised refrigerant is drawn back from the second evaporator 26 to the first circuit, via a location 27, by the compressor 16.

The AC installation is controlled by a control unit 28. The control unit 28 receives information from a first temperature sensor 29 which detects the temperature of the air in the driving cab space 2, and from a second temperature sensor 30 which detects the temperature of the battery. The control unit 28 uses this information to control the operation of the compressor 16 and the reversible pump 13 in the cooling system 12. The control unit 28 controls also a first valve 31 by which refrigerant flow through the first circuit can be prevented, and a second valve 32 by which refrigerant flow through the second circuit can be prevented.

During operation of the vehicle, the control unit 28 receives information from the temperature sensor 30 concerning the temperature of the battery 8. When energy is stored in the battery 8 or when the battery 8 supplies energy for operation of the vehicle 1, the battery 8 and the electrical components 9 are inevitably subject to warming. For its optimum operation, the battery 8 should be at a temperature between 20 and 30° C. The battery must not be above a maximum acceptable temperature. This temperature varies from battery to battery. Nor should the regulating equipment 9 be above a maximum acceptable temperature which may normally be somewhat higher than the battery's maximum acceptable temperature. To prevent the battery 8 from going above the maximum acceptable temperature, the pump 13 circulates coolant through the cooling system in the direction depicted in FIG. 2. The coolant circulates here in two parallel line regions 12a, 12b in heat-transfer contact with the battery 8 and the regulating equipment 9 respectively. During normal operation, the coolant thus cools the battery 8 and the regulating equipment 9. The warm coolant is led to the radiator 14, in which it is cooled by air at the temperature of the surroundings. Thermal energy is thus released in the radiator 14. So long as the control unit 28 receives information to the effect that the battery is maintaining an acceptable temperature, it keeps the valve 32 in a closed position in which no refrigerant is led through the second circuit which comprises the second condenser 24 and the second evaporator 26. The control unit 28 receives information also from the temperature sensor 29. If the air in the cab space 2 needs cooling, the control unit 28 activates the compressor 16 and opens the valve 31 so that refrigerant is led through the first circuit.

If it receives information from the temperature sensor 30 to the effect that the battery 8 is above the maximum acceptable temperature, the control unit 28 will find that the cooling system 12 alone is not capable of cooling the battery. Such may be its finding if the battery 8 reaches a temperature above a threshold value set with a certain margin relative to the maximum acceptable temperature. When the control unit 28 finds that this is so, it activates the compressor 16, if not already activated, and opens the valve 32. This will cause at least part of the refrigerant from the compressor 16 to be led through the second circuit. The refrigerant in the second circuit reaches initially the second condenser 24, in which it is cooled by the coolant to a temperature at which it condenses. The coolant in the cooling system 12 thus undergoes a corresponding warming in the second condenser 24. The warm coolant is thereafter led to the radiator 14, in which it is cooled by surrounding air. The refrigerant undergoes throttling in the expansion valve 25 before it reaches the second evaporator 26. The refrigerant is led to the second evaporator 26 at a reduced pressure and a reduced temperature. The pressure and temperature of the refrigerant will here be such that it vaporises in the second evaporator 26 at a temperature which is definitely lower than that of the surroundings. When the coolant reaches the second evaporator 26, it can thus undergo a second step of cooling to a temperature which is with advantage lower than that of the surroundings. The cold coolant from a second evaporator 26 is led to the battery 8 and the regulating equipment 9 to cool them. After the refrigerant has vaporised in the second evaporator 26, it is led back to the first circuit at the location 27.

Using the second circuit of the AC installation thus subjects the coolant to a warming in the second condenser 24, a cooling in the radiator 14 and a final cooling in the second evaporator 26 before it is led to the battery 8 and the regulating equipment 9. As the coolant is initially warmed in the second condenser 24, it will be at a somewhat higher temperature when it leaves the radiator 14 than when the cooling system alone is used. The final cooling in the second evaporator 26 does however make it possible for the coolant to be cooled to below the temperature of the surroundings. Such cooling is not possible in the radiator 14, in which surrounding air is used as cooling agent. Cooling the coolant to below the temperature of the surroundings may be necessary to prevent the battery from reaching an unacceptably high temperature, particularly when there is a high ambient temperature. However, running the AC installation entails energy consumption. In this case the AC system is only used to cool the battery at times when this is necessary. The use of the AC installation and the consequent energy consumption to cool the battery 8 and the regulating equipment 9 are thus minimised.

When the vehicle is being started from cold or the surroundings are at a very low temperature, the control unit 28 may receive temperature values from the temperature sensor 30 which indicate that the battery is at an unacceptably low temperature, as depicted in FIG. 3. In this case, the control unit 28 starts the compressor 16 and at the same time opens the valve 32. The refrigerant is thereby led through the second circuit. In these conditions, the first circuit is not normally used to cool the air in the cab space 2. The valve 31 is therefore probably closed. The control unit 28 here activates the reversible pump 13 to circulate the coolant in an opposite direction in the cooling system as compared when the battery 8 and the regulating equipment 9 are being cooled. The coolant leaving the battery 8 and the regulating equipment 9 is here led initially through the second evaporator 26 in which it undergoes cooling. The coolant is thereafter led through the radiator 14, in which the air warms it at times when it is colder than the air. This results in supply of thermal energy to the coolant in the radiator 14. The coolant is led finally through the second condenser 24, in which it undergoes warming to a temperature which is definitely above that of the surroundings. The warm coolant is led through the line regions 12a, 12b, in which it relatively quickly warms the battery 8 and the regulating equipment 9 to an acceptable temperature. When it receives information from the temperature sensor 30 to the effect that the battery has reached an acceptable temperature, the control unit 28 switches the compressor 16 off and at the same time closes the valve 32 so that the circulation of the refrigerant through the second circuit ceases. In this case the AC installation is used to warm the battery. The AC installation according to the invention can thus be used to both cool and warm the battery 8 and regulating equipment 9 with the object of keeping them at a desired temperature.

The invention is in no way confined to the embodiment to which the drawings refer but may be varied freely within the scopes of the claims. The container 7 with the battery and the regulating equipment 9 is in this case fastened to a longitudinal member 4, but it may be fastened at substantially any desired location in a vehicle. If the vehicle is a bus, the container 7 with the battery 8 and the regulating equipment 9 may be fastened on the roof of the bus.

The invention claimed is:

1. An arrangement for maintaining a desired operating temperature of a battery in a vehicle, the arrangement comprising:
    a cooling system with a circulating coolant in the cooling system, the cooling system comprises a radiator in which the coolant is cooled and comprises a heat-transfer region located and configured such that the coolant is in contact with the battery;
    an AC installation with a circulating refrigerant in the installation, the AC installation comprises a first circuit, a second circuit and a compressor, the refrigerant being passed between the first circuit and the second circuit through the compressor,
    the first circuit including:
    a first evaporator configured and located in the vehicle such that a refrigerant passing through the first evaporator cools air in a driving cab space of the vehicle;
    a first condenser communicating with the first evaporator to receive the refrigerant and in which the refrigerant releases thermal energy;
    the second circuit including:
    a second evaporator configured and located to cool coolant from the radiator to the battery such that the refrigerant passing through the second evaporator cools the coolant in the cooling system, and the second evaporator being connected to supply vaporized refrigerant to the compressor;
    a second condenser communicating with the first circuit to receive the refrigerant from the compressor, is located to warm the coolant to the radiator and to cool the refrigerant received from the first circuit by exchange of heat with the coolant, the second evaporator being arranged to receive refrigerant from the second condenser;
    the radiator is at a location in the cooling system between a first location where coolant exchanges heat with the second condenser and a second location where the coolant exchanges heat with the second evaporator;
    the cooling system comprises a circulator configured and operable for circulating the coolant in different directions through the cooling system; and
    a control unit configured and operable to control a first valve to prevent flow of refrigerant through the first circuit and a second valve to prevent flow of refrigerant through the second circuit,
    wherein the control unit controls the arrangement to circulate the refrigerant through the second circuit and not through the first circuit when the cooling system alone has insufficient capacity to maintain a desired operating temperature of the battery, and
    wherein the second valve is arranged to prevent flow of refrigerant to the second condenser from the compressor.

2. An arrangement according to claim 1, further comprising a container enclosing the battery.

3. An arrangement according to claim 2, wherein the second condenser and the second evaporator are within the container.

4. An arrangement according to claim 1, wherein the second circuit includes the second condenser and the second evaporator is arranged in parallel flow of the refrigerant relative to the first circuit including the first condenser and the first evaporator.

5. An arrangement according to claim 1, wherein the radiator is air-cooled for cooling the coolant in the cooling system.

6. An arrangement according to claim 5, wherein the radiator is situated at an external location from a container enclosing the battery.

7. An arrangement according to claim 1, further comprising a second heat transfer region; and
    regulating equipment configured and operable for regulating the flow of electrical energy to and from the battery, wherein the regulating equipment is situated within a container enclosing the battery and is in contact in the container with the coolant in the second heat-transfer region of the arrangement.

8. An arrangement according to claim 1, further comprising an expansion valve connected between the second condenser and the second evaporator to expand and cool the condensed refrigerant and to supply the expanded and cooled refrigerant from the second condenser to the second evaporator.

* * * * *